UNITED STATES PATENT OFFICE.

ALFRED POLLAK, OF MAISONS ALFORT, NEAR PARIS, FRANCE.

PROCESS OF PROMOTING ACID FERMENTATION.

1,123,920. Specification of Letters Patent. Patented Jan. 5, 1915.

No Drawing. Application filed July 15, 1913. Serial No. 779,094.

*To all whom it may concern:*

Be it known that I, ALFRED POLLAK, a subject of the German Emperor, residing at Maisons Alfort, near Paris, France, have invented certain new and useful Improvements in Processes of Promoting Acid Fermentation, of which the following is a specification.

My invention relates generally to the treatment of fermentable substances, and has particular reference to a process for increasing the acid formation and the formation of nitrogen-yielding salts in fermentable substances, whereby the latter are rendered more suitable for subsequent fermentation.

The principal object of my invention is to increase the acid formation in carbohydrate-containing material, and an incidental object is to form in such substances soluble salts of the acid whereby the nitrogen content of the substance is increased and the fermentation enhanced.

In numerous industrial processes as now practised, it is customary to produce natural acidity in the fermentable substance for the purpose of rendering the liquid more susceptible to subsequent yeast fermentation. In the manufacture of lactic acid it has been demonstrated by experience, that the formation of lactic acid ceases when the acidity has reached a certain degree dependent on the temperature employed, and the character of the lactic acid bacteria. If it is desired to continue the acid formation and to render the occurring physiological processes more intense, the mass is neutralized with alkali, in order to minimize the resulting acid concentration which tends to stop fermentation. In the manufacture of lactic acid, the neutralization is effected by the addition to the mash of calcium carbonate in any form, which binds the lactic acid present and precipitates out as calcium lactate.

According to the present invention, I employ ammonia or its unstable combinations to bind the acid which has formed. By the use of ammonia or its combinations, soluble salts of the acid which has been formed by the fermentation process are produced. These salts are not only beneficial to the diastase actions which are often necessary in processes of the kind referred to, but they also form culture salts which yield valuable nitrogeneous products for the sprouting yeast. It has also been heretofore proposed to use ammonia combinations, such as carbonate of ammonia, to increase the nitrogeneous content of fermentable substances. I believe it to be novel, however, to add ammonia or strongly alkaline ammonia combinations to the mass, gradually and in proportion to the quantity of acid formed as the result of fermentation. By this treatment I am enabled to greatly increase the acid formation, and to cause a corresponding increase in the formation of the soluble salt of ammonia of the acid which has formed. In the subsequent course of manufacture this salt acts as a culture and exciting medium for the yeast.

Another novel feature of my process consists in using an alkali in the form of an ammonium combination, such as the unstable combination of ammonium with formaldehyde, *i. e.* hexamethylentetramin. The latter binds lactic acid to such a degree that it is no longer capable of stopping fermentation, and even in the double combination with organic acid, the hexamethylentetramin acts as an excellent medium to excite the yeast.

I am aware that formaldehyde has been frequently employed as a medium to accelerate fermentation, and that it has been admixed with milk and such mixture added to yeast. I believe it to be novel, however, to use this antiseptic in the form of hexamethylentetramin for the purposes above pointed out. Owing to its ammonia content, hexamethylentetramin is a strongly alkaline reacting combination which is admirably adapted to enhance the formation of organic acids and to effect an increase in the quantity of nitrogenous substances. German Patent 254592 covers a process wherein hexamethylentetramin is added to yeast or other substances to increase the fermentative properties thereof. My invention differs from this patent in that the hexamethylentetramin is employed to gradually neutralize organic acids during fermentation and to cause the formation of substantial quantities of organic salts which act as a culture medium for the yeast.

In practising the process it is preferable to analyze the acid formation at different stages, and when a certain degree of acid concentration has been reached, sufficient ammonia or the like is added to neutralize one-half to three-fourths of the acid which has formed. Acidification is then permitted to continue up to the attainable maximum degree, and the saturation is repeated as frequently as the increasing salt concentration will permit or until the desired increase in nitrogenous content has been effected. Ordinarily the fluid contains but two to two and one-half percentum of lactic acid ferment, but by my process I am enabled to increase this yield four fold and at the same time to obtain a substance which is highly desirable for fermentation purposes.

The following examples are illustrative of the manner in which my novel process may be practised.

Example I: To a mash of any desired raw material add a pure culture of bacteria capable of forming acids, such as lactic acid, and then subject to acidification at a suitably high temperature. When the maximum of acid formation has been reached, a specimen of the mash is titrated, in the laboratory, with the suitable alkali up to the point of neutrality as determined by the selected indicator, e. g. phenolphthalein. The quantity used for neutralization is compared with the total quantity of mash, and there is then added to the latter so much ammonium or the like that the quantity thereof is equal to from one-half to three-fourths of the quantity of acid present. In this partly neutralized mash the acid evolving bacteria continue their work until the maximum acidification has been again attained. The neutralization procedure is then repeated until the increasing salt concentration stops the fermentation. In the manner described, the quantity of lactic acid produced by fermentation may be increased to eight percentum. I may use as neutralization media, ammonia, ammonium carbonate, crude ammonium carbonate, ammonium carbamate or hexamethylentetramin. The latter may be produced very simply by the admixture of ammonium and formaline solution.

Example II: Acidulate as in Example I, but before neutralization, divide the mash into two parts, completely neutralize one part and mix it with the other part, which amounts to between one-half and one-fourth of the entire mass. This procedure is safer and prevents injury, by excess neutralization, to the fermentative power of the lactic acid bacteria. The mash as thus treated may be used for the preparation of yeast or alcohol.

Example III: In place of mash, I may use any saccharine solution or any desired extract of small or great concentration, in which desired acidification and increase of nitrogenous yield is effected. Preparations of this kind may be added to any kind of substances to be fermented, and may also be used in any case where enzymic effects are to be obtained in a maximum degree. Such preparations may be used, for example, in baking powders to increase dough formation and fermentation.

Having thus described my invention what I claim as new and desire to secure by Letters Patent is:—

1. The herein described process of promoting lactic acid fermentation with the production of a residue enriched with organic nitrogen-containing salts and adapted to be subjected to alcoholic fermentation, which process consists in fermenting carbohydrate-containing material to form lactic acid therein and gradually neutralizing the lactic acid with ammonia derivatives.

2. The herein described process of promoting acid fermentation, which consists in fermenting carbohydrate-containing material to form acid therein, and gradually neutralizing such acid with hexamethylentetramin.

In testimony whereof I have affixed my signature in presence of two witnesses.

ALFRED POLLAK.

Witnesses:
 ING. CHEM TOERLING,
 D. WERTHEIMER.